(12) United States Patent
Wunning et al.

(10) Patent No.: US 7,029,271 B2
(45) Date of Patent: Apr. 18, 2006

(54) FLAMELESS OXIDATION BURNER

(75) Inventors: Joachim G. Wunning, Leonberg (DE);
Joachim A. Wünning, Leonberg (DE)

(73) Assignee: WS Warmeprozesstechnik GmbH, Renningen (DE)

( * ) Notice: Subject to any disclaimer, the term of this patent is extended or adjusted under 35 U.S.C. 154(b) by 0 days.

(21) Appl. No.: 10/417,696

(22) Filed: Apr. 17, 2003

(65) Prior Publication Data

US 2004/0091830 A1    May 13, 2004

(30) Foreign Application Priority Data

Apr. 19, 2002    (DE) ................................ 102 17 524

(51) Int. Cl.
*F23D 11/44*    (2006.01)

(52) U.S. Cl. ................. 431/215; 431/11; 431/348; 431/158; 431/159; 126/91 A; 432/179; 432/180; 432/181; 432/182

(58) Field of Classification Search ................. 431/11, 431/348, 158, 159, 215; 126/91 A; 432/179, 432/180, 181, 182
See application file for complete search history.

(56) References Cited

U.S. PATENT DOCUMENTS

| 871,070 | A | * | 11/1907 | Schwartz | 432/160 |
|---|---|---|---|---|---|
| 2,294,168 | A | * | 8/1942 | Francis et al. | 432/224 |
| 2,590,063 | A | * | 3/1952 | Bailey, Jr. | 431/173 |
| 2,794,620 | A | * | 6/1957 | Arnold et al. | 175/14 |
| 3,045,766 | A | * | 7/1962 | Fleming, Jr. | 175/14 |
| 3,156,454 | A | * | 11/1964 | Flynn | 432/222 |
| 3,182,734 | A | * | 5/1965 | Scott | 175/14 |
| 3,221,797 | A | * | 12/1965 | Wall | 431/348 |
| 3,224,486 | A | * | 12/1965 | Geller et al. | 431/6 |
| 3,385,381 | A | * | 5/1968 | Calaman | 175/14 |
| 3,529,812 | A | * | 9/1970 | Wunning | 432/176 |
| 3,729,286 | A | * | 4/1973 | Iida et al. | 431/174 |
| 3,749,548 | A |  | 7/1973 | Zink et al. |  |
| 4,230,447 | A | * | 10/1980 | Boyne et al. | 431/158 |
| 4,298,333 | A | * | 11/1981 | Wunning | 431/11 |

(Continued)

FOREIGN PATENT DOCUMENTS

DE    3700444    *  7/1988

(Continued)

OTHER PUBLICATIONS

Deutsches Patent- und Markenamt Office Action to German Counterpart Application No. 102 17 524.1.

*Primary Examiner*—Carl D. Price
(74) *Attorney, Agent, or Firm*—Leydig, Voit & Mayer, Ltd.

(57) ABSTRACT

A device including a burner (6) for directing a fuel/air mixture into a reaction chamber (2) for flameless oxidation of fuels. The burner (6) discharges a fuel/air jet transversely to a longitudinal axis (A) of the burner and an exhaust gas channel (17) is arranged in or on the burner concentric or parallel to the burner longitudinal axis (A). An outlet direction (R) of the fuel/air jets from the burner and the direction (A) of the exhaust gas channel cross each other. Hence, the burner introduces fuel parallel or at an angle to the wall into the furnace chamber where the burner is mounted for flameless oxidation of the fuel.

15 Claims, 3 Drawing Sheets

U.S. PATENT DOCUMENTS

| | | | | |
|---|---|---|---|---|
| 4,392,818 A | * | 7/1983 | Wunning | 431/215 |
| 4,586,894 A | * | 5/1986 | Wunning | 431/158 |
| 4,877,396 A | * | 10/1989 | Wunning | 431/158 |
| 5,076,344 A | | 12/1991 | Fields et al. | |
| 5,154,599 A | * | 10/1992 | Wunning | 431/215 |
| 5,513,981 A | * | 5/1996 | Harbeck et al. | 431/263 |
| 5,520,534 A | * | 5/1996 | Nakagawa et al. | 431/215 |
| 5,813,845 A | * | 9/1998 | Eiermann | 431/2 |
| 5,813,846 A | * | 9/1998 | Newby et al. | 431/9 |
| 6,033,208 A | * | 3/2000 | Wunning | 431/215 |
| 6,293,275 B1 | * | 9/2001 | Wunning | 126/91 A |
| 2002/0015932 A1 | | 2/2002 | Pie | |

FOREIGN PATENT DOCUMENTS

| | | | |
|---|---|---|---|
| EP | 0 249 760 A2 | | 5/1987 |
| EP | 0 463 218 B1 | | 6/1990 |
| EP | 0 463 218 A1 | | 1/1992 |
| GB | 1585304 | * | 2/1981 |
| JP | 02-106606 | * | 4/1990 |
| JP | 03-91605 | * | 4/1991 |

* cited by examiner

FLAMELESS OXIDATION BURNER

FIELD OF THE INVENTION

The present invention relates generally to heating burner devices, and more particularly to a burner device for the flameless oxidation of fuels.

BACKGROUND OF THE FILED OF THE INVENTION

The heating of furnace chambers with burners, which are designed for flameless oxidation of fuel within the furnace chamber, is known in the art. Burners which heat a furnace chamber by means of flameless oxidation have significant advantages for many applications over burners that form flames. The heat generation can be distributed over a large area of the furnace chamber and the formation of nitrogen oxides is low.

Flameless oxidation, as well as a furnace suitable for this process, disclosed in EP 0463218 B1. The furnace includes a furnace chamber with walls in which one or more burners are arranged. Fuel and air are introduced into the furnace chamber by means of the burners and exhaust gas is discharged. The burners generate a fuel/air mixture which is injected through an axial fuel outlet into the furnace chamber as a jet in perpendicular relation to the furnace wall.

These burners are particularly suitable for heating chamber furnaces in which the space in front of the burner is free of objects which could be struck by the fuel/air mixture. However, there is often the desire to also heat such furnace chambers with burners operating without flames even when objects are located in front of the burner or if the burners cannot be operated with an axial fuel outlet for other reasons. In that case, so-called flat-flame burners, ceiling jet burners, or side-wall burners often are used. However, since these burners do not operate with flameless oxidation the known disadvantages of such burners, such as the formation of local, very hot zones and a high production of nitrogen oxides must be taken into account.

OBJECTS AND SUMMARY OF THE INVENTION

It is an object of the present invention to provide a burner device for flameless oxidation of fuels which is suitable for more versatile usage.

Another object is to provide a burner device that is operable with flameless oxidation of fuels even when objects may be located directly in front of the burner.

In carrying out the invention, there is provided a device that has a reaction chamber with a wall and at least one burner with a burner head, which extends through the wall. The burner head has an internal chamber through which flows pre-heated air or a fuel-air mixture, which is discharged in a jet through one or more outlet openings leading into the reaction chamber. The outlet opening has an outlet direction inclined or parallel to the wall, i.e., in non-perpendicular relation to the wall. Thus, the air, the fuel, or the fuel-air mixture is not directed perpendicular relative to the wall into the reaction chamber, but instead in one or more jets angled away from the burner axis. Objects arranged in the reaction chamber in front of the burner are thus not struck by the fuel-air mixture. The reaction chamber may be a furnace chamber or an internal chamber of a radiant tube. The wall may be the furnace wall or the radiant tube.

The fuel and air are directed essentially without spin, spreading out in individual jets in the vicinity of the fuel head. It has been shown that these jets are not pulled along or significantly disrupted by an exhaust jet flowing transversely in the vicinity of the jets into the exhaust channel. This can be accomplished by designing or setting the cross sectional outlets for the flows of the fuel-air mixture and of the exhaust jet so that they have very different properties. For relatively high fuel and/or air speed, a comparatively much lower exhaust speed is produced. The fuel-air jet can thus entrain, mix with, and react with parts of the slower exhaust jet without producing flames. The exhaust channel, whose inlet opening is arranged in the vicinity of the burner head, also can be designed so that the fuel-air jet is deflected towards and contacts the wall.

The inlet opening of the exhaust channel can be arranged around the burner head. While the inlet opening of the exhaust channel ends at the wall, the burner head projects somewhat into the reaction chamber. Thus, the jets of the burner-air mixture cross the inlet openings of the exhaust channel in front of the wall. The inlet opening can be divided, if necessary, into several partial openings. For example, it is possible to provide screens in the inlet opening, which further reduce the exhaust speed in the vicinity of the outlet openings of the burner head.

The burner head preferably is formed so that the fuel-air mixture from the outlet opening is at a speed sufficient for flushing away any possible flames. This enables flameless operation in which the reaction of fuel and air is distributed over a greater part of the reaction chamber. In addition, the fuel-air jet suctions and entrains considerable exhaust gas in the vicinity of the inlet opening of the exhaust gas channel, which further supports the flameless operation.

The burner preferably contains means, such as a recuperator or a regenerator, for pre-heating the fuel, the air, or the fuel-air mixture. This further results in good energy usage and supports the formation of flameless oxidation.

Preferably, the burner is provided with means for switching between a first and a second operating modes, wherein in the first operating mode a flame is formed partially within the burner head. This operating mode can be used for pre-heating. Local overheating of the reaction chamber is prevented because the flame extends only partially from the burner head. After the warm-up period, the burner can be switched into a second operating mode. This prevents overheating of parts of the reaction chamber or the burner head due to the reaction being distributed over a large area. The switching between operating modes can be realized by changing the supply of fuel, by changing the air or gas speeds, or by adjusting flame retention baffles arranged in the interior chamber of the burner head.

Other objects and advantages of the invention will become apparent upon reading the following detailed description and upon reference to the drawings, in which:

BRIEF DESCRIPTION OF THE DRAWINGS

Additional details of advantageous embodiments of the invention can be deduced from the drawings, the subsequent description, or subordinate claims. In the drawing, embodiments of the invention are illustrated. Shown are:

Figure 1:
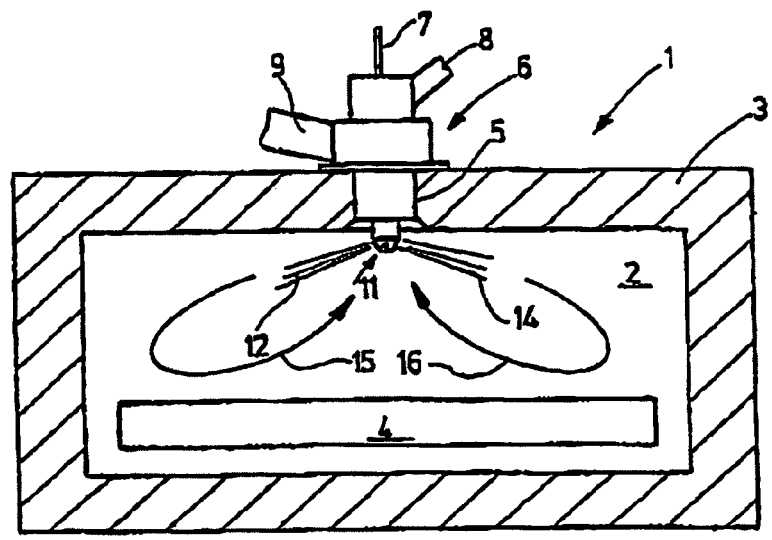
FIG. 1, is a partial section of an illustrative furnace having a non-axial flameless jet burner in accordance with the present invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF PREFERRED EMBODIMENTS

Referring now more particularly to the drawings, there is shown an illustrative furnace 1 in accordance with the invention. The furnace 1 in this case includes a furnace wall 3 in adjacent relation to a furnace reaction chamber 2 and is operable for heating an object or article 4 disposed within the chamber 2. The illustrated furnace wall 3 has a through hole 5 disposed above the object 4 to be heated, which extends in perpendicular relation to the wall 3. A burner 6 arranged in the through hole 5 is connected to a fuel line 7, an air-supply line 8, and an exhaust gas line 9. The burner 6 projects inwardly past the furnace wall 3 and has a burner head 11, which blows one or more jets 12, 14 of fuel-air mixture into the furnace chamber 2 to produce a large-area circulation, which is illustrated in FIG. 1 by arrows 15, 16.

Figure 2:
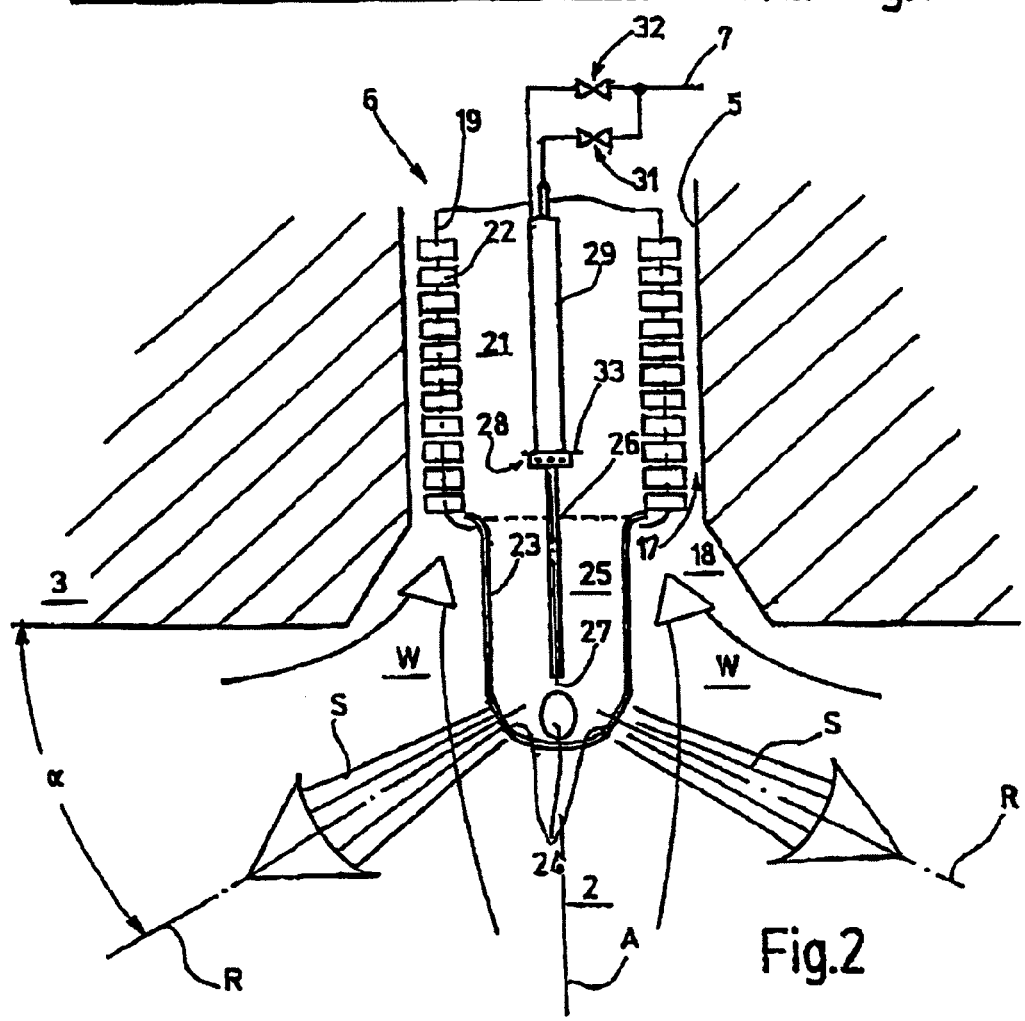
FIG. 2, is an enlarged fragmentary section of the burner shown in FIG. 1.

The burner 6, as depicted in FIG. 2, includes an exhaust gas channel 17 defined externally by the wall of the through hole 5 which can be provided with a lining, such as made from sheet metal. The hole 5 extends outwardly at the furnace chamber 2 to define a funnel-shaped, annular inlet opening 18 for the exhaust channel 17.

In the through hole 5, concentric to the hole, a recuperator tube 19 is arranged with ribs 22 defining an inner side of the exhaust gas channel 17 on the other side of which tube defines an air channel 21 connected to the air supply line 8. The recuperator tube 19 ends before, in this case above, the inlet opening 18 and carries an exchangeable burner head 23, preferably made from ceramic. The burner head 23 is closed at its terminal end, but is formed with one or more outlet openings 24 in the vicinity of its end projecting into the furnace chamber 2. The openings are oriented in angled or deviating relation to the axial direction A, to define fuel/air outlet directions R, which are oriented at acute angles α or parallel to the furnace wall 3 in which the burner is mounted. For different applications, it will be understood that different burner heads can be provided with differently angled outlet openings.

A burner tube 26 extends through the air channel 21 into an interior chamber 25 surrounded by the burner head 23. As shown, this tube can have a single, front-end gas outlet opening 27 and thus can generate a gas jet in the axial direction aligned with the closed end of the burner head 23. Alternatively, one or more nozzles, which each generate a gas jet in the direction of the outlet openings 24, can be arranged on the end of the burner tube 26. The gas outlet opening 27 is located in the vicinity of the outlet openings 24. One or more additional gas outlet openings 28 also can be provided a greater distance upstream of the outlet openings 24. Alternatively, outlet openings can also be arranged outside of the burner head 23 in the air channel 21 and can be supplied by a separate fuel tube 29. Preferably, however, the outlet openings are arranged in the region of the ceramic combustion chamber. The fuel tubes 26, 29 in this instance are connected by means of valves 31, 32, to the fuel line 7. In the vicinity of the gas outlet openings 28, a flame retention baffle 33 in this case is arranged.

The furnace 1 and the burner 6 described thus far operate as follows:

During start-up, the burner is operated in a first operating mode. Air is supplied through the air supply line 8 and the valve 32 is opened. The valve 31 remains closed. Therefore, gas is discharged at the gas outlet openings 28 and is ignited at that point by means of an appropriate ignition device. A resulting flame heats the burner head 23 and extends through the outlet openings 24 into the furnace chamber 2. The resulting exhaust gas heats the furnace chamber 2 and is led through the exhaust gas channel 17 into the exhaust gas line 9. The out-flowing exhaust gas heats the in-flowing fresh air in counter flow by means of the recuperator tube 19. Thus, the temperature in the furnace chamber 2 gradually rises. In addition, the preheated temperature of the air continues to rise until it reaches a desired temperature such as approximately 700°.

When the furnace chamber 2 is sufficiently preheated, the valve 31 is opened and the valve 32 is closed for operating the burner in a second operating mode. The gas now only flows out at the gas outlet opening 27. For this mode of operation, jets S consisting of fuel-air mixture flow out of the outlet openings 24 in the direction R with a speed that is so high that no flame can be maintained at the burner head 23 and at the outlet openings 24. In addition, in the vicinity of the burner head 23 there are no objects which generate small-area turbulence, which can slow down the flow and act as flame retention baffles. The burner head 23 is smooth on the outside. The jets S extend essentially in straight lines and diverge from one another into the furnace chamber 2. The large-area turbulence illustrated in FIG. 1 by the arrows 15, 16 is formed, which allows the exhaust gas to be recirculated multiple times. A smaller part of the exhaust gas finds the path into the inlet opening 18 of the exhaust gas channel 17, as FIG. 2 shows, past the jets S. Thus, the part of the exhaust gas led into the exhaust gas channel 17 must cross the path of the jets S. The path of the exhaust gas is marked in FIG. 2 by arrows W. The flameless oxidation distributed in the furnace chamber 2 prevents thermal overloading of the burner head 23 or other parts in the furnace chamber 2.

Figure 3:
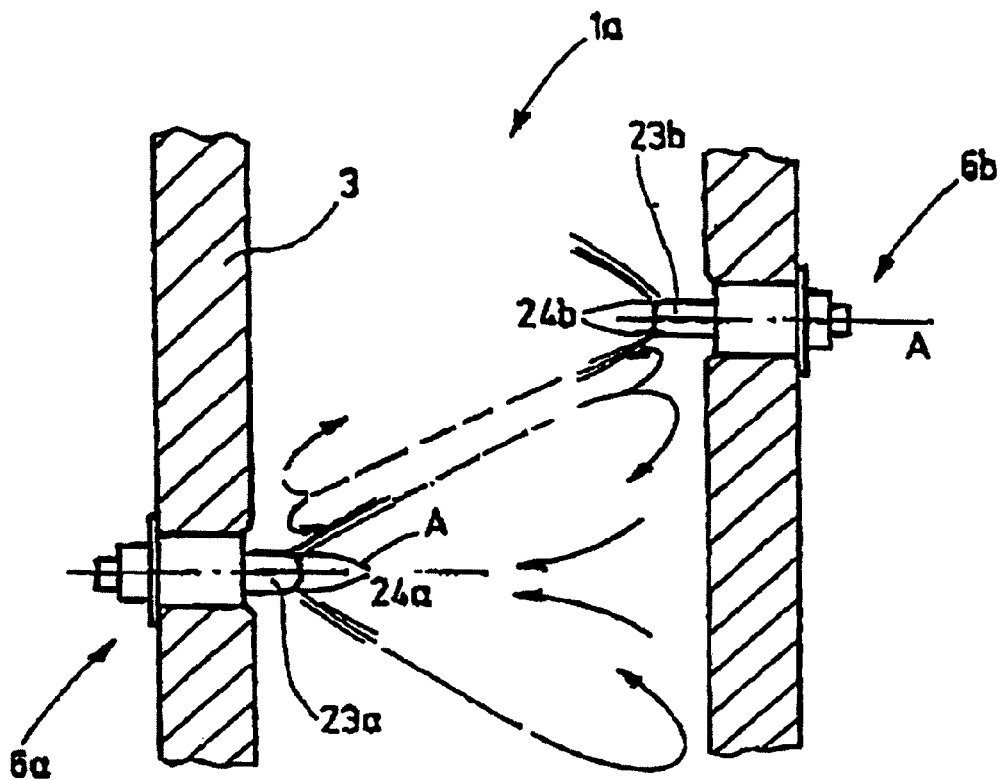
FIG. 3, is a schematic of an alternative embodiment of a furnace with a plurality of non-axial flameless burners in accordance with the invention.

FIG. 3 illustrates a modified embodiment of a furnace 1a in accordance with the invention equipped with several burners 6a, 6b, which are identical, in terms of construction. These burners are arranged, in offset relation on opposite parts of the furnace wall 3. The burners 6a, 6b are essentially identical to the burner shown in FIG. 2. Only the burner heads 23a, 23b are formed differently in that the outlet openings 24a, 24b are oriented at a somewhat steeper angle α, such as 45° or 60° or other angle, to the furnace wall 3 deviating from the axial direction A. The flow pattern shown in FIG. 3 is formed, which produces an operation with flameless oxidation.

Figure 4:
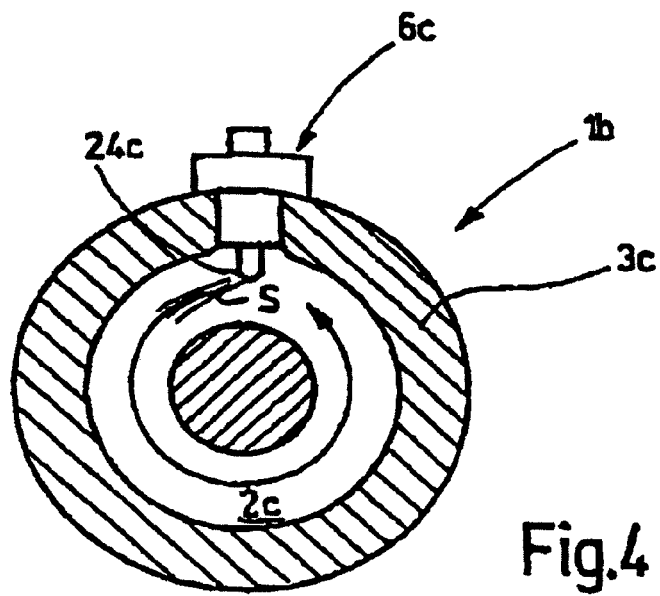
FIG. 4, is a schematic section of still another alternative embodiment of non-axial flameless burner according to the invention.

Another embodiment of a furnace 1b according to the invention is shown in FIG. 4. This furnace has a round furnace chamber 3c and a round burner 6c. The burner 6c is identical to the burner 6 from FIG. 2 with the exception of the burner head 23. The burner head in this instance only a single outlet opening 24c, which can discharge the fuel-air jet S approximately in the peripheral direction of the furnace chamber 2c. The gas flow is indicated in FIG. 4 by an arrow 34.

Figure 5:
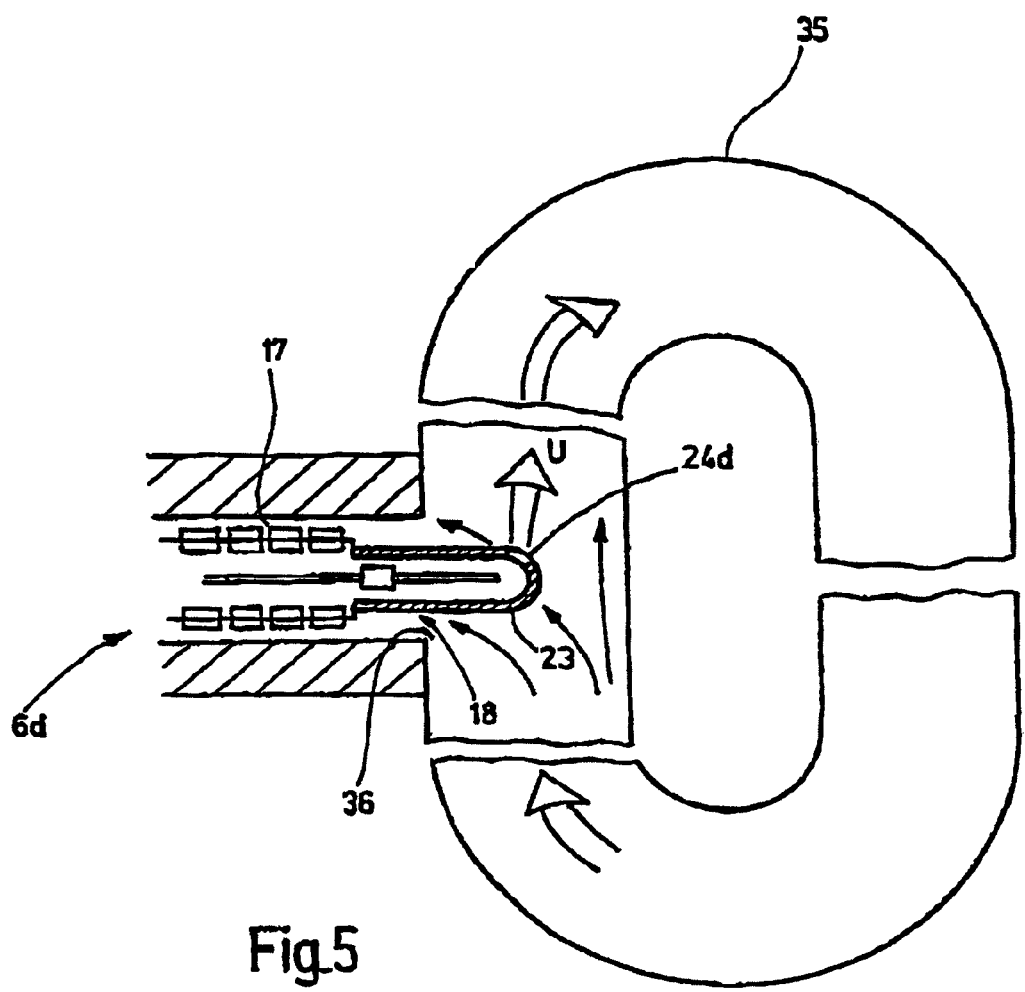
FIG. 5, according to the invention mounted within a radiant tube for indirect heating of a furnace chamber with flameless oxidation.

A flameless burner with non-axial fuel-air jet according to the invention can also be used for heating radiant tubes. FIG. 5 shows an embodiment, in which an annular closed radiant tube 35 is heated by a burner 6d. The inner chamber of the radiant tube 35 forms a reaction chamber, previously defined by the furnace chamber 2. The burner 6d is essentially identical to the burner 6 shown in FIG. 2. The burner head 23, however, has only a single outlet opening 24d, which is oriented approximately in the radial direction and thus parallel to the wall formed by the radiant tube 35. The radiant tube 35 has an opening 36 to which the burner 6d is connected. The opening 36 is thus used both for the supply of air and fuel and also for the discharge of exhaust gas. The inlet opening 18 of the exhaust gas channel 17 connects directly to the opening 36. The open direction of the outlet opening 24d is identical to the circulating direction U in the radiant tube 35, which is essentially defined by the center axis of the radiant tube. The outlet opening 24d is preferably arranged on this center axis of the radiant tube. During operation, the radiant tube 35 glows. In its interior, a flow is maintained, which can be two or three times as large as the flow through the exhaust gas channel 17. The flameless oxidation also can be adjusted.

From the foregoing, it can be seen that a device for flameless oxidation of fuels is provided which has a reaction chamber 2 supplied with a fuel-air mixture by a burner 6. The burner 6 discharges the fuel-air jet transversely to its longitudinal axis A. An exhaust gas channel 17 is arranged in or on the burner concentric or parallel to the burner longitudinal axis A. The outlet direction R of the burner and the direction A of the exhaust gas channel cross one another. This results in burners which introduce fuel parallel or at an angle to the furnace wall into the furnace chamber and are designed for flameless oxidation of the fuel.

The invention claimed is:

1. An apparatus for flameless oxidation of fuels comprising a device (1) defining a reaction chamber (2) and having a first side wall (3) adjacent the reaction chamber (2), a burner (6) extending through the first side wall (3), said burner (6) including a burner head (23) that defines an elongated interior burner chamber (25) having a longitudinal axis and at a least one outlet opening (24) an air supply for directing air into said burner head chamber (25), a fuel supply having a first outlet (28) in said burner head chamber (25) and a second outlet (27) in said burner head chamber (25), said first and second fuel supply outlets (28, 27) being located at different distances from said at least one burner chamber outlet opening (24), said first fuel supply outlet (28) being sufficiently remote from said at least one burner headoutlet opening (24) such that fuel and air introduced into said burner head chamber (25) is combustible with a flame at least partially within said burner chamber (25); said second fuel supply outlet (27) being in sufficiently close proximity to said at least one burner head outlet opening (24) such that said fuel and air introduced into said burner chamber (25) forms a fuel/air mixture that is emitted from said outlet opening without forming a flame, a control device for selectively operating said burner (6) in a first operating mode in which fuel introduced into said burner head chamber (25) from said first fuel outlet (28) burns with a flame at least partially within said burner head (23) and a second operating mode in which fuel and air introduced into said burner head chamber (25) from said second fuel outlet (27) and are discharged from said at least one burner head outlet opening (24) as an fuel/air mixture without forming a flame, said device having an exhaust gas chamber (17) with an inlet opening (18) adjacent the burner head (23) through which an exhaust gas flow in said reaction chamber is directed for withdrawal from the reaction chamber (2), and said at least one burner head outlet opening (24) being oriented for directing the flameless fuel/air mixture into said reaction chamber (2) during operation of said burner in said second operating mode in non-perpendicular relation to the first side wall (3) at an angle to the longitudinal axis of said burner head chamber (25) in a recirculation pattern that crosses the exhaust gas flow for preventing formation of a flame at the at least one burner head outlet opening (24) and effecting flameless oxidation of the fuel/air mixture in said reaction chamber along an area adjacent the first side wall (3).

2. The apparatus of claim 1 in which said outlet opening (24) of said burner head (23) is formed to a direct fuel/air mixture at an acute angle to the first side wall (3) within which the burner is mounted.

3. The apparatus of claim 1 in which said outlet opening (24) of said burner head (23) is formed to direct a fuel/air mixture in substantial parallel relation to the first side wall (3).

4. The apparatus of claim 1 in which said inlet opening (18) of said exhaust gas chamber (17) concentrically surrounds said burner head (23).

5. The apparatus of claim 1 in which said burner head outlet opening (24) is effective for directing a fuel/air mixture at a speed sufficient to flush away and extinguish any flame created by the fuel/air mixture.

6. The apparatus of claim 1 in which said burner includes an exhaust passage effective for preheating a fuel/air mixture to be directed from said burner.

7. The apparatus of claim 6 in which said burner includes a recuperator for preheating a fuel/air mixture to be directed from said burner.

8. The apparatus of claim 1 in which said burner (6) has a plurality of fuel supply paths (26, 27, 28, 29) that can be selectively used when switching the operating modes of the burner.

9. The apparatus of claim 1 including a in which said fuel supply having has an adjustable flame retention baffle (33) adjacent an outlet opening thereof.

10. The apparatus of claim 1 in which said reaction chamber has a depth defined by a second wall opposite to and parallel the first side wall, and said at one outlet opening is oriented for directing a fuel/air mixture into said chamber without impinging said second wall.

11. The apparatus of claim 10 in which said reaction chamber has a rectangular configuration.

12. The apparatus of claim 1 in which said reaction chamber has an elongated configuration with a depth from the first side wall that is less than a lateral width of the reaction chamber for receiving an item to be heated, and said at least one outlet opening is oriented for directing a fuel/air mixture into said chamber without impinging an item to be heated in the chamber.

13. The apparatus of claim 1 in which said device defines a fuel/air mixture supply passage communicating with said at least one outlet opening through which all of the fuel/air mixture directed through said device passes.

14. The apparatus of claim 13 including a supply of fuel/air mixture directable into said fuel/air mixture passage.

15. The apparatus of claim 1 in which said exhaust gas chamber extends in parallel surrounding relation to said burner head chamber.

* * * * *